(12) United States Patent
Bellows

(10) Patent No.: US 7,689,734 B2
(45) Date of Patent: Mar. 30, 2010

(54) METHOD FOR TOGGLING NON-ADJACENT CHANNEL IDENTIFIERS DURING DMA DOUBLE BUFFERING OPERATIONS

(75) Inventor: Gregory H. Bellows, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 11/958,642

(22) Filed: Dec. 18, 2007

(65) Prior Publication Data

US 2009/0157913 A1 Jun. 18, 2009

(51) Int. Cl.
*G06F 13/28* (2006.01)
(52) U.S. Cl. .......................................... 710/22; 710/27
(58) Field of Classification Search .................. 710/22, 710/27
See application file for complete search history.

(56) References Cited

U.S. PATENT DOCUMENTS 5,907,717 A * 5/1999 Ellis ............................ 710/56

6,985,977 B2 * 1/2006 Vrancic ......................... 710/59

OTHER PUBLICATIONS

Developing Code for Cell—DMA by IBM's System and Technology Group Date: Jun. 27, 2006.*

* cited by examiner

*Primary Examiner*—Henry W. H. Tsai
*Assistant Examiner*—Eric T Oberly
(74) *Attorney, Agent, or Firm*—Dillon & Yudell LLP

(57) ABSTRACT

Disclosed are a method, a system and a computer program product for managing direct memory access (DMA) operations in a double buffering system. During direct memory access operations in a computer system, data is transferred from a source memory location to a destination memory location with minimal use of the computer's processing unit. Double buffering utilizes two separate memory buffers to perform simultaneous DMA operations. Prior to processing a DMA request each buffer in a double buffering system is assigned a channel identification (ID), or tag. When reading, writing, or polling status of data in a buffer, the tag identifies the buffer. A toggle factor is utilized to conveniently switch between each buffer in the double buffering system. Utilizing a toggle factor decreases latencies in DMA operations.

17 Claims, 5 Drawing Sheets

METHOD FOR TOGGLING NON-ADJACENT CHANNEL IDENTIFIERS DURING DMA DOUBLE BUFFERING OPERATIONS

BACKGROUND

1. Technical Field

The present invention generally relates to computer systems and in particular to data transfer in computer memory systems.

2. Description of the Related Art

Direct memory access (DMA) is an operation which may control the memory system of a computer without utilizing the central processing unit (CPU). During DMA operations, data may be moved from one memory location to another memory location, typically while the computer is in a low power mode. DMA operations utilize the same memory bus as the CPU; therefore, only one of the CPU or a device performing a DMA (operation) can access the memory at any one time. DMA operations may be utilized in conjunction with "double buffering" operations to minimize delays in input/output processes such as data transfer to and from memory locations. During double buffering of DMA operations, a separate channel is utilized for each buffer to perform input/output operations. Each buffer is assigned a channel identification (ID), or tag.

In a tag managed system, tags are assigned to each buffer according to availability. Numerically adjacent tags may be assigned to a buffer pair; however, the opportunity to assign numerically adjacent tags diminishes due to normal DMA operations. Expediting data transfer between memory locations is highly dependent on whether the tags assigned to each buffer are numerically adjacent. If the tags are not numerically adjacent the previously expeditious process becomes time-consuming.

SUMMARY OF ILLUSTRATIVE EMBODIMENTS

Disclosed are a method, a system and a computer program product for managing direct memory access (DMA) operations in a double buffering system. During direct memory access operations in a computer system, data is transferred from a source memory location to a destination memory location with minimal use of the computer's processing unit. Double buffering utilizes two separate memory buffers to perform simultaneous DMA operations. Prior to processing a DMA request each buffer in a double buffering system is assigned a channel identification (ID), or tag. When reading, writing, or polling status of data in a buffer, the tag identifies the buffer. A toggle factor is utilized to conveniently switch between each buffer in the double buffering system. Utilizing a toggle factor decreases latencies in DMA operations.

In one embodiment, double buffering operations utilize two separate memory buffers to process DMA requests. Double buffering operations minimize the time spent waiting for DMA data transfers to complete. Prior to a double buffering operation, each buffer is assigned a tag (channel identifier) from one or more tags in a tag managed system. The tag managed system may systematically or randomly associate an available tag with each of the two buffers in a double buffering system. During DMA operations, a "toggle" factor is utilized to switch between the buffers and associated channel. Switching between the buffers and associated channels allow the DMA operations to occur via each buffer (and channel), simultaneously. During simultaneous DMA processing, DMA transfers are conducted via one of the buffers, while computations are performed via the second buffer.

In one embodiment, the invention provides a method, which utilizes an exclusive "OR" factor for toggling between buffers during DMA operations. The exclusive "OR" factor for toggling, or "toggle factor", allows switching between buffers in a timely and efficient process. The tags may be numerically adjacent or non-adjacent. Switching between buffers, within a double buffering system, may occur multiple times, until the DMA operation is complete in all buffers. The exclusive "OR" toggle factor identifies a factor that allows a smooth transition while switching to/from each buffer, when performing simultaneous DMA operations. The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
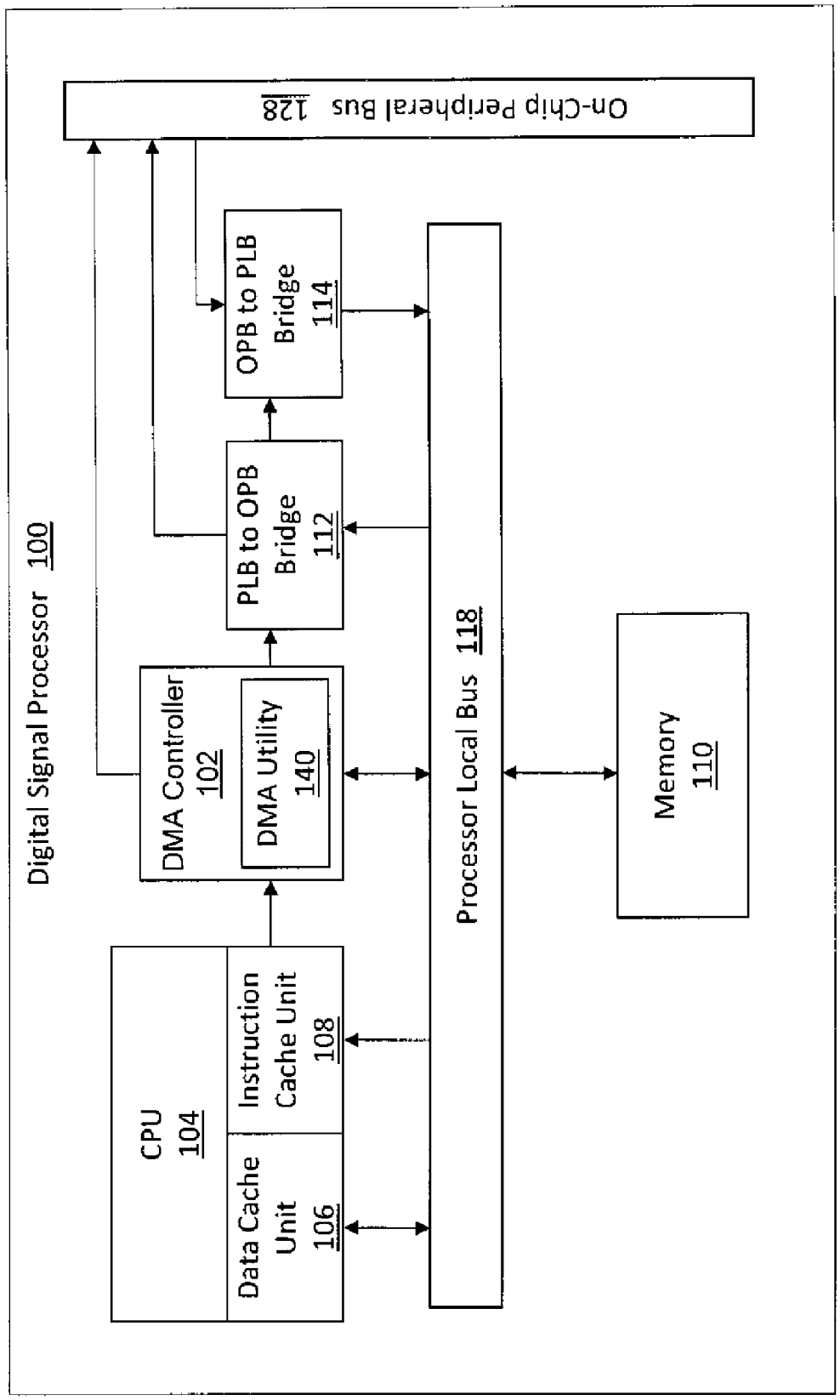
FIG. 1 is a block diagram of an example digital signal processor (DSP) with an interconnected DMA (direct memory access) controller according to one embodiment of the invention.

Disclosed are a method, a system and a computer program product for managing direct memory access (DMA) operations in a double buffering system. During direct memory access operations in a computer system, data is transferred from a source memory location to a destination memory location with minimal use of the computer's processing unit. Double buffering utilizes two separate memory buffers to perform simultaneous DMA operations. Prior to processing a DMA request, each buffer in a double buffering system is assigned a channel identification (ID), or tag. When reading, writing, or polling status of data in a buffer, the tag identifies the buffer. A toggle factor is utilized to conveniently switch between each buffer in the double buffering system. Utilizing a toggle factor decreases latencies in DMA operations.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to the figures, FIG. 1 depicts a block diagram representation of a digital signal processor (DSP). DSP 100 comprises at least one core processor or central processing unit (CPU) 104, memory 110, DMA (direct memory access) controller 102, processor local bus (PLB) 118, and on-chip peripheral bus (OPB) 128. CPU 104 includes data cache unit 106 and instruction cache unit 108. Other peripherals such as peripherals connected via the serial and parallel port (not shown) are linked to PLB 118 through OPB to PLB bridge 114. PLB devices may link to OPB 128 via PLB 118 to OPB bridge 112. The components of DSP 100 are interconnected by a bus architecture which produces high performance under desired operating conditions. As it relates to the current invention the term "bus" is used herein to refer to a multiple conductor transmission channel which may be utilized to carry data, such as operands or instructions, addresses, and/or control signals.

Notably, in addition to the above described hardware components of DSP 100, various features of the invention are completed via software (or firmware) code or logic of DMA utility 140, and executed by DMA controller 102. For simplicity, DMA utility 140 is illustrated as a standalone or separate software/firmware component which provides specific functions as described herein. Among the software code/instructions provided by DMA utility 140, and which are specific to the invention, are: (a) code for toggling tags, enabling data transfers to adjacent and non-adjacent I/O DMA channels; and (b) code for maneuvering data to available I/O DMA channels utilizing double buffering operations. For simplicity of the description, the collective body of code that enables these various features is referred to herein as DMA utility 140. According to the illustrative embodiment, when DMA controller 102 executes DMA utility 140, DSP 100 initiates a series of functional processes, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The digital signal processor depicted in FIG. 1 may be, for example, an IBM Advanced Communications Processor, a product of International Business Machines Corporation in Armonk, N.Y. Also, while described as occurring within a DSP, the features of the various features of the invention may be equally implemented within a standard data processing system or any other device that supports DMA operations.

Figure 2:
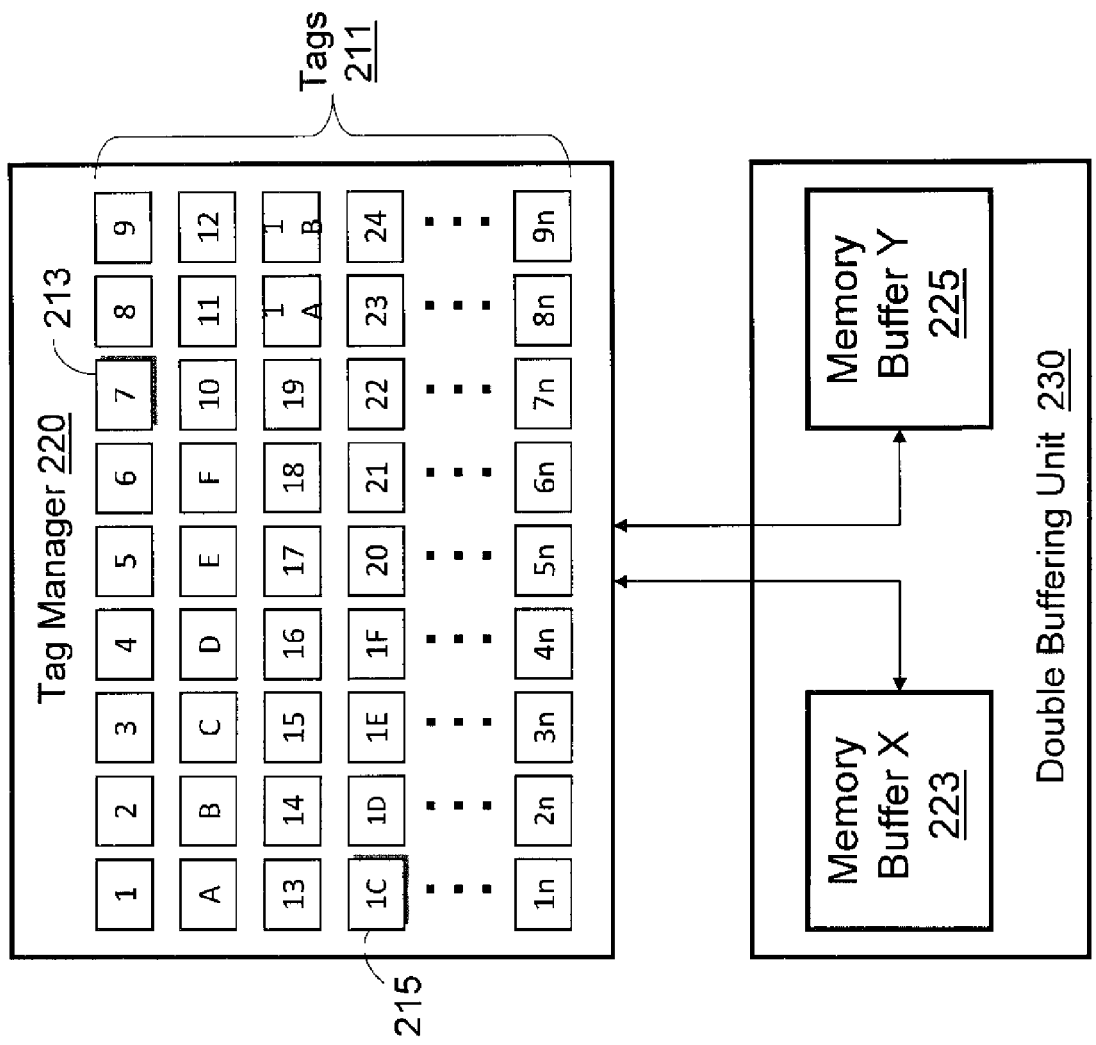
FIG. 2 is a block diagram illustrating the assignment of tags to memory buffers in a double buffering system.

With reference now to FIG. 2, wherein is depicted a block diagram illustrating the allocating of tags to buffers in a double buffering system. FIG. 2 comprises double buffering unit 230 and tag manager 220. Within double buffering unit 230 are memory buffer X 223 and memory buffer Y 225. Tag manager 220 encompasses a finite number of tags 211 to be assigned to memory buffers within double buffering unit 230. Double buffering unit 230 may contain multiple pairs of buffers for processing data; however, two buffers are shown for illustrative purposes. Tags 211 are labeled utilizing hexadecimal numbering. Tag-7 213 and tag-1C 215 are selected for memory buffer X 223 and memory buffer Y 225, respectively.

In one embodiment, prior to processing a double buffering operation two tags of tags 211 are requested from tag manager 220. Tags 211 are unique labels which associate each buffer with a DMA channel. DMA channels are utilized during the DMA double buffering operation to complete the DMA data transfer from the source memory location to the destination memory location. The DMA channel associated with the buffer is utilized to complete data transfers during the DMA process. Within tag manager 220 there may be 'n' (where 'n' is a finite variable) number of tag IDs related to 'n' number of DMA channels available within tag manager 220; however only two tags are necessary for each double buffering pair. Tags 211 of tag manager 220 may be utilized by multiple processes, therefore the assigned tags may not be numerically adjacent.

In one embodiment, two buffers are conducting DMA processes simultaneously; therefore, separate and distinct DMA channels are assigned to the buffers utilizing tags 211 within tag manager 220. Tag-7 213 and tag-1C 215 are assigned to memory buffer X 223 and memory buffer Y 225 by tag manager 220. Tag-7 213 and tag-1C 215 identify memory buffer X 223 and memory buffer Y 225, respectively when a DMA operation is initiated. Tag-7 213 and tag-1C 215 may be utilized to identify when the memory buffers are waiting on completion of DMA commands and/or determining status of memory buffer X 223 and memory buffer Y 225.

Figure 3:
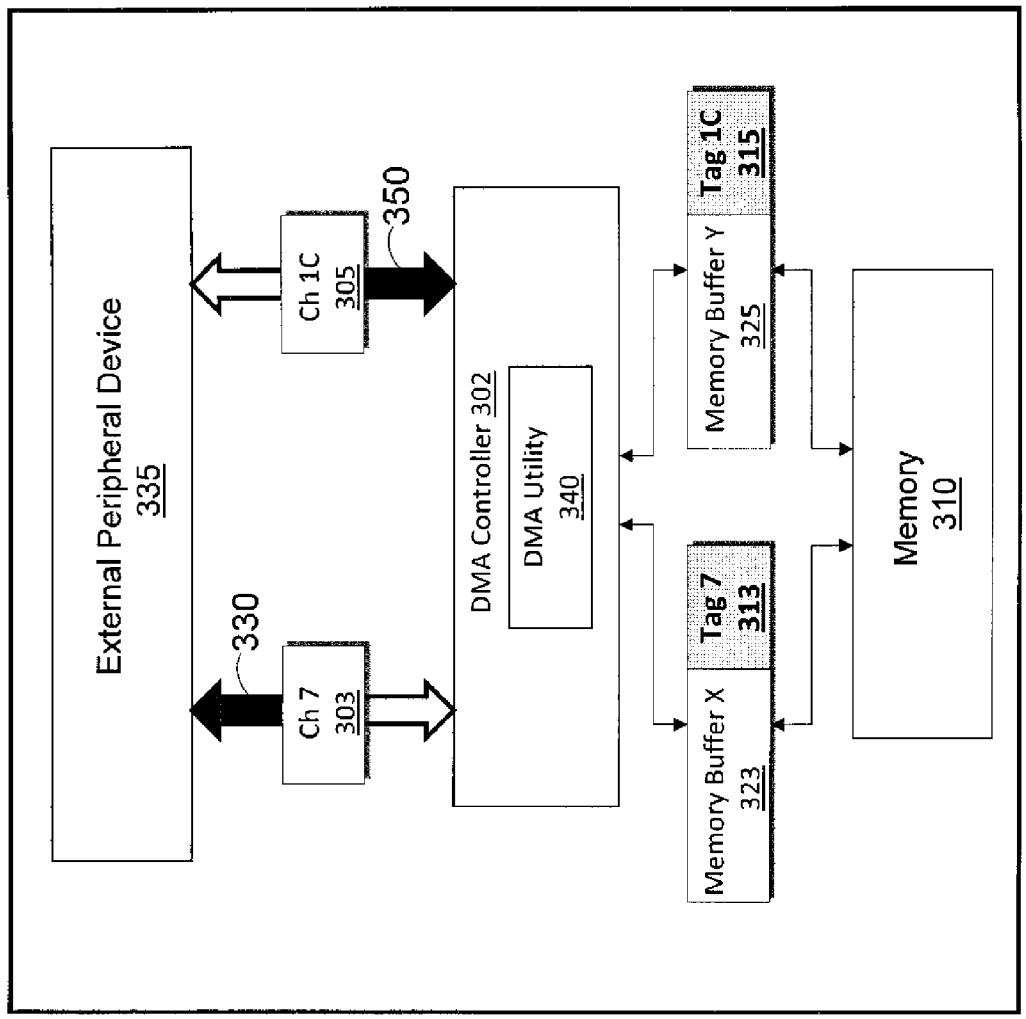
FIG. 3 is a block diagram of DMA and dual buffering operations in accordance with one embodiment of the invention.

FIG. 3 illustrates a DMA controller managing data transfers between an external peripheral device and an internal memory device, such as memory 110. FIG. 3 comprises DMA controller 302 which allows the transfer of data from memory 310 to external peripheral memory 335. DMA controller 302 manages data transfers from memory buffer X 323 and memory buffer Y 325. Memory buffer X 323 and memory buffer Y 325 are associated with channel-7 303 and channel-1C 305 via tag-7 313 and tag-1C 315. Channel-7 303 and channel-1C 305 may report information (e.g., availability, execution time, data transferring capability) to DMA controller 302. DMA data transfer 330 and consume data 350 are initiated by utility 340. DMA utility 340 resides within DMA controller 302.

In one embodiment, DMA utility 340 manages the toggling of memory buffer X 323 and memory buffer Y 325 during DMA operations. Memory buffer X 323 and memory buffer Y 325 are utilized in double buffering operations during data transfer. Double buffering operations utilize memory buffer X 323 and memory buffer Y 325 to minimize delays in the DMA data transfers by avoiding circumstances such as buffer under-run (i.e., slow data transfer) and buffer overflow. DMA utility 340 activates memory buffer X 323, thereby initiating DMA data transfer 330 via channel-7 303. When DMA data transfer 330 is activated, DMA utility 340 toggles to memory buffer Y 325, and initiates consume data 350. The process of "toggling" between memory buffer X 323 and memory buffer Y 325 may occur repeatedly until all DMA data has been received and/or retrieved.

In one embodiment, tag-7 313 and tag-1C 315 associated with memory buffer X 323 and memory buffer Y 325 is how channel-7 303 and channel-1C 305 are identified when DMA operations are occurring in the channels. Each "toggle" between memory buffer X 323 and memory buffer Y 325 is also a "toggle" between channel-7 303 and channel-1C 305, respectively. The "toggle" manage by DMA utility 340, may mathematically be explained utilizing the hexadecimal label of tag-7 313 and tag-1C 315. The toggling factor is designed to select one of the two DMA tags regardless of the hexadecimal label. The toggle factor is created by utilizing the product of exclusive "OR" logic.

The hexadecimal encoding on each tag (tag-7 313=7 and tag-1C 315=1C) are exclusively "ORed" yielding a product, which is referred to as the "toggle factor." For example: tag-7 313 exclusively "ORed" with tag-1C 315 yields toggle factor "1B" (tag-7 XOR tag-1C=7 $\oplus$ 1C=1B). To toggle to the next memory buffer in the double buffering system the logic code utilizes the current memory buffer exclusively "Ored" with the "toggle factor." The resulting value produces the hexadecimal label of the next memory buffer. For example: tag-7 XOR "toggle factor"=7$\oplus$1B=1C. The product "1C" is the hexadecimal label for tag-1C 315 of memory buffer 325. To switch back to the original memory buffer the mathematical example for the logic code is as such: 1C$\oplus$1B=7 (tag-7 313). The process of switching between the memory buffers utilizing the exclusive "OR" factor may repeat until the DMA operations are complete for the double buffering pair.

Figure 4:
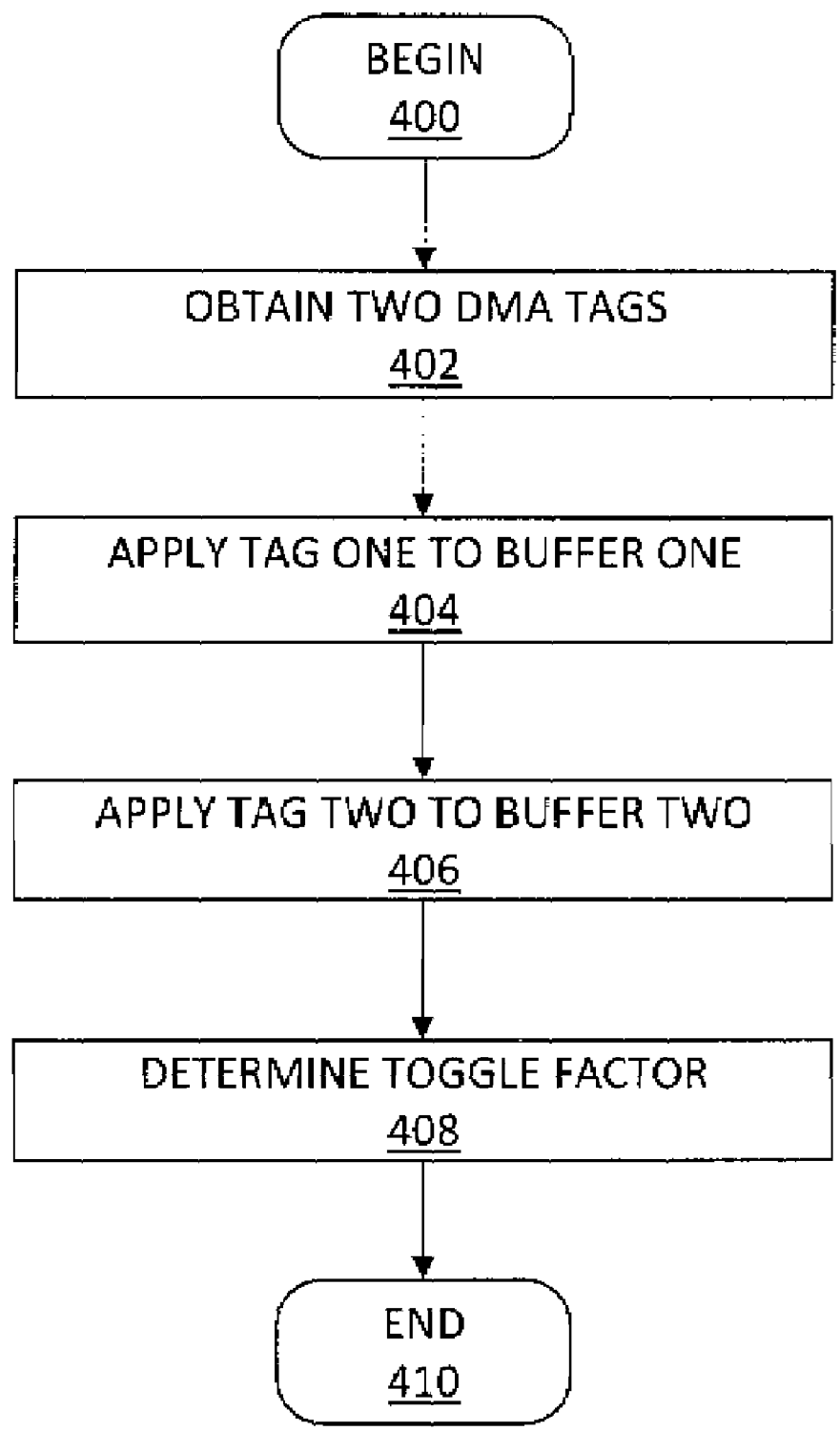
FIG. 4 is a logic flow chart illustrating the method for applying tags to buffer for DMA operations, according to one embodiment of the invention.

FIG. 4 is a flow chart illustrating a method by which the above processes of the illustrative embodiments are completed. Although the methods illustrated in FIG. 4 may be described with reference to components shown in FIGS. 1-3, it should be understood that this is merely for convenience and alternative components and/or configurations thereof can be employed when implementing the method. Key portions of the method may be completed by DMA utility 140 executing within DSP 100 (FIG. 1) and controlling specific operations of DSP 100, and the method is thus described from the perspective of DMA utility 140 and DSP 100.

The process of FIG. 4 begins at initiator block 400 and proceeds to block 402, at which two DMA tags are obtained from tag manager 220 (FIG. 2). At step 404, the first selected tag is applied to the first selected memory buffer in a double buffering system. Applying the selected tag to the selected memory buffer associates the memory buffer with a DMA channel. A second selected tag is applied to the second memory buffer in the double buffering system, at step 406. At step 408, the toggle factor is determined by the DMA utility (140) utilizing the hexadecimal labels of the selected tags. The toggle factor will allow switching to and from the memory buffers in the double buffering system, during DMA operations.

Figure 5:
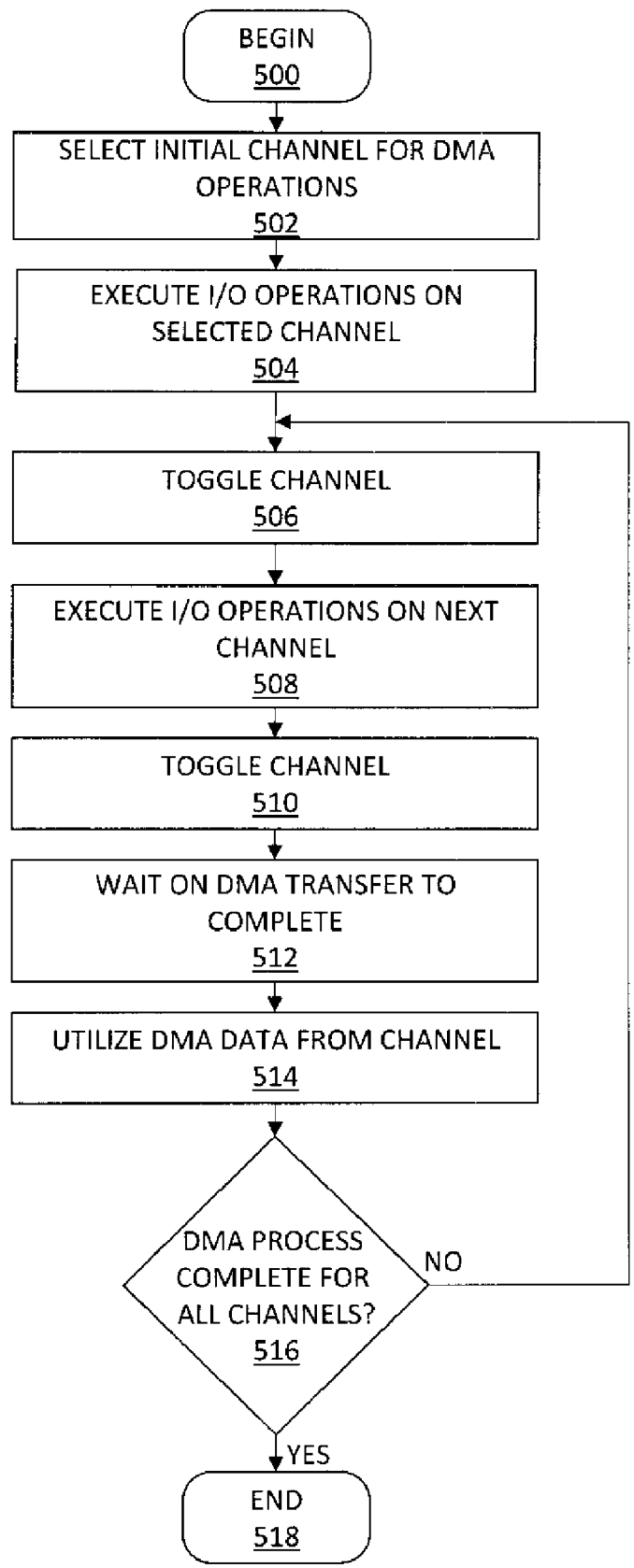
FIG. 5 is a logic flow chart illustrating the method for toggling between available DMA channels according to one embodiment of the invention.

After the two tags have been selected from the tag manager (220) and applied to the two respective memory buffers, then each memory buffer, in the double buffering system, is directly associated with a channel via the selected tags. Therefore, when a channel is selected by the DMA utility, the respective buffer is automatically selected (and vice versa). The process of FIG. 5 begins at initiator block 500. At block 502, the initial channel buffer for DMA operations is selected by the DMA utility. The process continues to block 504 where I/O operations are executed on the selected channel. At block 506, the DMA utility toggles to the next channel within the double buffering system. I/O operations are executed on the channel selected by the DMA utility, at block 508.

At block 510, another toggle occurs; thereby, the DMA utility switches back to the initial channel. At block 512, the DMA utility waits on the DMA transfer to complete for the memory buffer. The DMA data from the channel may then be utilized in the destination memory location, at block 514. A decision is made at block 516, whether the DMA operations is complete for all channels. If the DMA operations are not complete for all channels, the process returns to step 506, where the DMA utility toggles to the next channel. If the DMA operations are complete for all channels the process ends at block 518. Notably, in the above process, the two DMA operations may be related (transferring and consuming the same data) or unrelated, such that simultaneous operations may occur at each buffer, with or without overlapping data.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system supporting DMA data operations via a double buffering DMA system by which two buffers having separate and distinct DMA channels concurrently conduct DMA data operations, a method comprising:
    receiving a first DMA tag and a second DMA tag, wherein said first DMA tag and said second DMA tag respectively provide unique labels of a first memory buffer and a second memory buffer of the double buffering DMA system and which associate the first memory buffer and the second memory buffer with a first DMA channel and a second DMA channel;
    deterministically toggling between the first memory buffer and the second memory buffer, using the first DMA tag and the second DMA tag, during double buffering DMA data transfer;
    wherein the first DMA tag of the first memory buffer includes a first hexadecimal label that identifies the first memory buffer and corresponding first DMA channel;
    wherein the second DMA tag of the second memory buffer includes a second hexadecimal label, different from the first hexadecimal label, that identifies the second memory buffer and corresponding second DMA channel; and
    wherein said deterministically toggling further comprises:
        performing a first exclusive "OR" operation of the first hexadecimal label and the second hexadecimal label to produce a toggle factor;
        performing a second exclusive "OR" operation with the first hexadecimal label of the first memory buffer and the toggle factor to generate the second hexadecimal label of the second memory buffer; and
        performing a third exclusive "OR" operation with the second hexadecimal label of the second memory buffer and the toggle factor to generate the first hexadecimal label of the first memory buffer.

2. The method of claim 1, wherein said deterministically toggling between the first memory buffer and the second memory buffer further comprises:
    activating the first memory buffer and initiating a first DMA operation via the first DMA channel;
    toggling to the second memory buffer and initiating a second DMA operation via the second DMA channel; and
    dynamically toggling between the first memory buffer and the second memory buffer until the first DMA operation and the second DMA operation are complete.

3. The method of claim 1, wherein:
    said receiving of the first DMA tag and the second DMA tag includes receiving the first and second DMA tags from a tag manager, which has at least two DMA tags representing different DMA channels that may be assigned to corresponding DMA buffers; and
    said method further comprises:
        selecting the first memory buffer and the second memory buffer from multiple available memory buffers; and
        associating the first DMA tag and the second DMA tag to respective ones of the first memory buffer and the second memory buffer selected;
        wherein the associating of the first DMA tag and the second DMA tag to the first memory buffer and the second memory buffer provides the first memory buffer with a corresponding first DMA channel and the second memory buffer with a corresponding second DMA channel.

4. The method of claim 1, further comprising:
    determining the toggle factor utilizing the first hexadecimal label associated with the first DMA tag and the second hexadecimal label associated with the second DMA tag;
    wherein the toggle factor enables dynamic switching between the first DMA memory buffer and the second DMA memory buffer in the double buffering system, during DMA data operations.

5. The method of claim 1, further comprising:
    dynamically selecting a first DMA channel associated with the first memory buffer for DMA data operations;
    executing input/output (I/O) DMA data operations via the first DMA channel;
    dynamically toggling from the first DMA channel to a second DMA channel within the double buffering system;
    performing I/O DMA data operations via the second DMA channel;
    deterministically switching between the first DMA channel and the second DMA channel and performing I/O operations on a current active channel until all DMA data operations for the double buffering system are complete.

6. The method of claim 1, further comprising:
    receiving a request to complete a direct memory access (DMA) operation within a double buffering DMA system;
    dynamically selecting the first DMA tag and the second DMA tag from a DMA tag manager in response to receiving the request;
    respectively allocating the first DMA tag and the second DMA tag to the first memory buffer and the second memory buffer in the double buffering DMA system; and
    when one of the first memory buffer and the second memory buffer is engaged in the DMA operation, deterministically selecting the other one of the first memory buffer and the second memory buffer to complete a portion of the DMA operation, wherein an active memory buffer completing the DMA operation is dynamically selected via a selection mechanism involving the first DMA tag and the second DMA tag.

7. The method of claim 6, wherein said deterministically selecting further comprises:
    when the second memory buffer is the active buffer:

selecting the first DMA tag while the second memory buffer is engaged in performing DMA data operations by performing an exclusive 'OR' of the toggle factor and the second DMA tag;

automatically activating the first memory buffer as the active memory buffer, wherein the second memory buffer is de-activated as the active memory buffer when a toggle to the first memory buffer is implemented;

executing the DMA operations via the first memory buffer when the first DMA tag is the exclusive 'OR' product of the toggle factor and the second DMA tag; and when the first memory buffer is the active memory buffer:

selecting the second DMA tag while the first memory buffer is engaged in performing DMA data operations by performing an exclusive 'OR' of the toggle factor and the first DMA tag;

automatically activating the second memory buffer as the active memory buffer, wherein the first memory buffer is de-activated as the active memory buffer when a toggle to the second memory buffer is implemented; and executing DMA operations via the second memory buffer when the second DMA tag is selected from the exclusive 'OR' product of the toggle factor and the first DMA tag.

8. A processor chip comprising:

a processor component;

a DMA controller coupled to the processor component;

logic associated with the DMA controller, which logic performs the functions of:

receiving a first DMA tag and a second DMA tag, wherein said first DMA tag and said second DMA tag respectively provide unique labels of a first memory buffer and a second memory buffer of the double buffering DMA system and which associate the first memory buffer and the second memory buffer with a first DMA channel and a second DMA channel;

deterministically toggling between the first memory buffer and the second memory buffer, using the first DMA tag and the second DMA tag, during double buffering DMA data transfer;

wherein the first DMA tag of the first memory buffer includes a first hexadecimal label that identifies the first memory buffer and corresponding first DMA channel;

wherein the second DMA tag of the second memory buffer includes a second hexadecimal label, different from the first hexadecimal label, that identifies the second memory buffer and corresponding second DMA channel; and wherein said logic for deterministically toggling further comprises logic for:

performing a first exclusive "OR" operation of the first hexadecimal label and the second hexadecimal label to produce a toggle factor;

performing a second exclusive "OR" operation with the first hexadecimal label of the first memory buffer and the toggle factor to generate the second hexadecimal label of the second memory buffer; and performing a third exclusive "OR" operation with the second hexadecimal label of the second memory buffer and the toggle factor to generate the first hexadecimal label of the first memory buffer.

9. The processor chip of claim 8, wherein said logic for deterministically toggling between the first memory buffer and the second memory buffer further comprises logic for:

activating the first memory buffer and initiating a first DMA operation via the first DMA channel;

toggling to the second memory buffer and initiating a second DMA operation via the second DMA channel; and dynamically toggling between the first memory buffer and the second memory buffer until the first DMA operation and the second DMA operation are complete.

10. The processor chip of claim 8, further comprising:

a tag manager having a finite number of tags that can be assigned to memory buffers within the double buffering unit, wherein the number of tags indicate a corresponding number of direct memory access (DMA) channels available within the tag manager for DMA data operations;

wherein said receiving of the first DMA tag and the second DMA tag includes receiving the first and second DMA tags from the tag manager, which has at least two DMA tags representing different DMA channels that may be assigned to corresponding DMA buffers; and said logic further comprises logic for:

selecting the first memory buffer and the second memory buffer from multiple available memory buffers; and associating the first DMA tag and the second DMA tag to respective ones of the first memory buffer and the second memory buffer selected;

wherein the associating of the first DMA tag and the second DMA tag to the first memory buffer and the second memory buffer provides the first memory buffer with a corresponding first DMA channel and the second memory buffer with a corresponding second DMA channel.

11. The processor chip of claim 8, further comprising logic for:

determining the toggle factor utilizing the first hexadecimal label associated with the first DMA tag and the second hexadecimal label associated with the second DMA tag;

wherein the toggle factor enables dynamic switching between the first memory buffer and the second memory buffer in the double buffering system, during DMA data operations; and wherein said deterministically toggling further comprises:

when the second memory buffer is the active memory buffer:

selecting the first tag while the second memory buffer is engaged in performing DMA data operations by performing an exclusive 'OR' of the toggle factor and the second DMA tag;

automatically activating the first memo buffer as the active memo buffer, wherein the second memory buffer is de-activated as the active memory buffer when a toggle to the first memory buffer is implemented;

executing the DMA operations via the first memory buffer when the first DMA tag is the exclusive 'OR' product of the toggle factor and the second DMA tag; and when the first memory buffer is the active memory buffer:

selecting the second DMA tag while the first memory buffer is engaged in performing DMA data operations by performing an exclusive 'OR' of the toggle factor and the first DMA tag;

automatically activating the second memory buffer as the active memory buffer, wherein the first memory buffer is de-activated as the active memory buffer when a toggle to the second memory buffer is implemented; and executing DMA operations via the second memory buffer when the second DMA tag is selected from the exclusive 'OR' product of the toggle factor and the first DMA tag.

12. The processor chip of claim 8, further comprising logic for:

dynamically selecting a first DMA channel associated with the first memory buffer for DMA data operations;

executing input/output (I/O) DMA data operations via the first DMA channel;

dynamically toggling from the first DMA channel to the second DMA channel within the double buffering system;

performing I/O DMA data operations via the second DMA channel;

deterministically switching between the first DMA channel and the second DMA channel and performing I/O operations on a current active DMA channel until all DMA data operations for the double buffering system are complete.

13. A data processing system comprising:

a processor;

a memory component coupled to the processor;

a DMA controller coupled to the processor component;

logic associated with the DMA controller, which logic performs the functions of:

receiving a first DMA tag and a second DMA tag, wherein said first DMA tag and said second DMA tag respectively provide unique labels of a first memory buffer and a second memory buffer of the double buffering DMA system and which associate the first memory buffer and the second memory buffer with a first DMA channel and a second DMA channel;

deterministically toggling between the first memory buffer and the second memory buffer, using the first DMA tag and the second DMA tag, during double buffering DMA data transfer;

wherein the first DMA tag of the first memory buffer includes a first hexadecimal label that identifies the first memory buffer and corresponding first DMA channel;

wherein the second DMA tag of the second memory buffer includes a second hexadecimal label, different from the first hexadecimal label, that identifies the second memory buffer and corresponding second DMA channel; and wherein said logic for deterministically toggling further comprises logic for:

performing a first exclusive "OR" operation of the first hexadecimal label and the second hexadecimal label to produce a toggle factor;

performing a second exclusive "OR" operation with the first hexadecimal label of the first memory buffer and the toggle factor to generate the second hexadecimal label of the second memory buffer; and performing a third exclusive "OR" operation with the second hexadecimal label of the second memory buffer and the toggle factor to generate the first hexadecimal label of the first memory buffer.

14. The data processing system of claim 13, wherein said logic for deterministically toggling between the first memory buffer and the second memory buffer further comprises logic for:

activating the first memory buffer and initiating a first DMA operation via the first DMA channel;

toggling to the second memory buffer and initiating a second DMA operation via the second DMA channel; and dynamically toggling between the first memory buffer and the second memory buffer until the first DMA operation and the second DMA operation are complete.

15. The data processing system of claim 13, further comprising:

a tag manager having a finite number of tags that can be assigned to memory buffers within the double buffering unit, wherein the number of tags indicate a corresponding number of direct memory access (DMA) channels available within the tag manager for DMA data operations;

wherein said logic for receiving of the first DMA tag and the second DMA tag includes logic for receiving the first and second DMA tags from a tag manager, which has at least two DMA tags representing different DMA channels that may be assigned to corresponding DMA buffers; and wherein said logic further comprises logic for:

selecting the first memory buffer and the second memory buffer from multiple available memory buffers; and associating the first DMA tag and the second DMA tag to respective ones of the first memory buffer and the second memory buffer selected;

wherein the associating of the first DMA tag and the second DMA tag to the first memory buffer and the second memory buffer provides the first memory buffer with a corresponding first DMA channel and the second memory buffer with a corresponding second DMA channel.

16. The data processing system of claim 13, further comprising logic for:

determining the toggle factor utilizing the first hexadecimal label associated with the first DMA tag and the second hexadecimal label associated with the second DMA tag;

wherein the toggle factor enables dynamic switching between the first memory buffer and the second memory buffer in the double buffering system, during DMA data operations; and wherein said deterministically toggling further comprises:

when the second memory buffer is the active memory buffer:

selecting the first tag while the second memory buffer is engaged in performing DMA data operations by performing an exclusive 'OR' of the toggle factor and the second DMA tag;

automatically activating the first memory buffer as the active memory buffer, wherein the second memory buffer is de-activated as the active memory buffer when a toggle to the first memory buffer is implemented;

executing the DMA operations via the first memory buffer when the first DMA tag is the exclusive 'OR' product of the toggle factor and the second DMA tag; and when the first memory buffer is the active memory buffer:

selecting the second DMA tag while the first memory buffer is engaged in performing DMA data operations by performing an exclusive 'OR' of the toggle factor and the first DMA tag;

automatically activating the second memory buffer as the active memory buffer, wherein the first memory buffer is de-activated as the active memory buffer when a toggle to the second memory buffer is implemented; and executing DMA operations via the second memory buffer when the second DMA tag is selected from the exclusive 'OR' product of the toggle factor and the first DMA tag.

17. The data processing system of claim 13, further comprising logic for:

dynamically selecting a first DMA channel associated with the first memory buffer for DMA data operations;

executing input/output (I/O) DMA data operations via the first DMA channel;

dynamically toggling from the first DMA channel to the second DMA channel within the double buffering system;

performing I/O DMA data operations via the second DMA channel;

deterministically switching between the first DMA channel and the second DMA channel and performing I/O operations on a current active DMA channel until all DMA data operations for the double buffering system are complete.

* * * * *